(12) United States Patent
Guo et al.

(10) Patent No.: US 7,929,728 B2
(45) Date of Patent: Apr. 19, 2011

(54) METHOD AND APPARATUS FOR TRACKING A MOVABLE OBJECT

(75) Inventors: Yanlin Guo, Lawrenceville, NJ (US); Harpreet Sawhney, West Windsor, NJ (US); Rakesh Kumar, West Windsor, NJ (US); Ying Shan, West Windsor, NJ (US); Steve Hsu, Sunnyvale, CA (US)

(73) Assignee: SRI International, Menlo Park, CA (US)

(*) Notice: Subject to any disclaimer, the term of this patent is extended or adjusted under 35 U.S.C. 154(b) by 1450 days.

(21) Appl. No.: 11/295,688

(22) Filed: Dec. 5, 2005

(65) Prior Publication Data
US 2006/0204035 A1    Sep. 14, 2006

Related U.S. Application Data

(60) Provisional application No. 60/633,264, filed on Dec. 3, 2004.

(51) Int. Cl.
*G06K 9/00* (2006.01)

(52) U.S. Cl. ........................................ 382/103

(58) Field of Classification Search .............. 382/103, 382/159, 165, 199, 218, 224; 348/169
See application file for complete search history.

(56) References Cited

U.S. PATENT DOCUMENTS

| 5,434,927 | A   | * | 7/1995  | Brady et al. ............... 382/104 |
| 6,049,619 | A   |   | 4/2000  | Anandan et al.                       |
| 2002/0041339 | A1 | * | 4/2002  | Diepold ..................... 348/700 |
| 2003/0235327 | A1 | * | 12/2003 | Srinivasa ................... 382/104 |
| 2004/0234136 | A1 | * | 11/2004 | Zhu et al. .................. 382/224 |
| 2005/0185826 | A1 | * | 8/2005  | Georgescu et al. ........ 382/103 |
| 2008/0056536 | A1 | * | 3/2008  | Hildreth et al. ............ 382/103 |

* cited by examiner

*Primary Examiner* — Brian Q Le
*Assistant Examiner* — Shervin Nakhjavan
(74) *Attorney, Agent, or Firm* — Lowenstein Sandler PC

(57) ABSTRACT

A method and apparatus for tracking a movable object using a plurality of images, each of which is separated by an interval of time is disclosed. The plurality of images includes first and second images. The method and apparatus include elements for aligning the first and second images as a function of (i) at least one feature of a first movable object captured in the first image, and (ii) at least one feature of a second movable object captured in the second image; and after aligning the first and second images, comparing at least one portion of the first image with at least one portion of the second image.

20 Claims, 11 Drawing Sheets

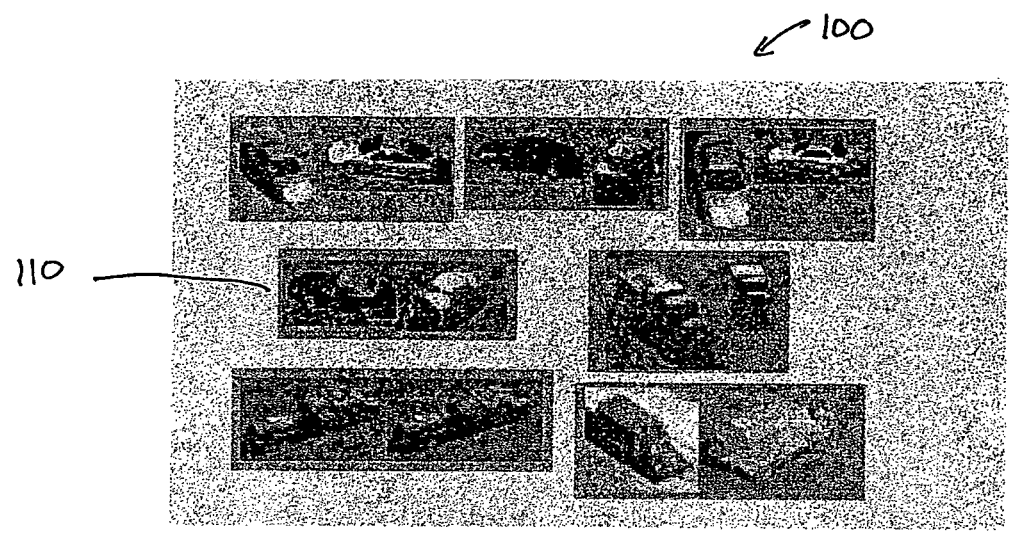
FIG. 6
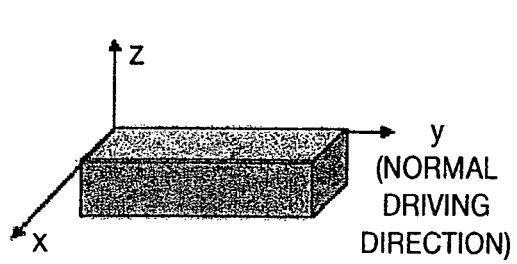 
FIG 7
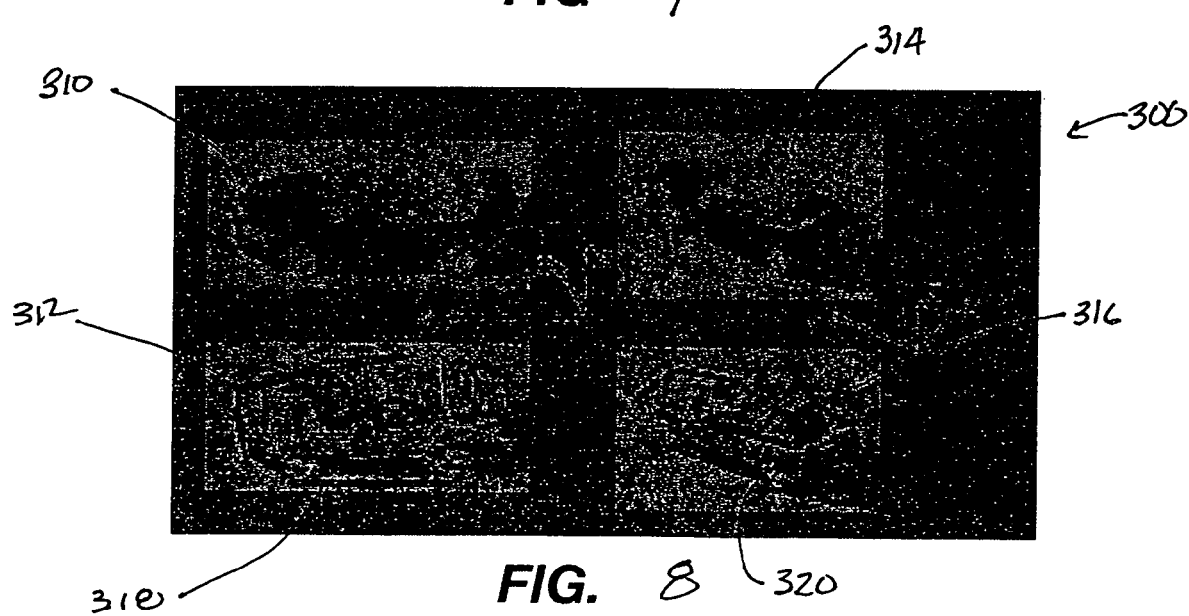
FIG. 8

METHOD AND APPARATUS FOR TRACKING A MOVABLE OBJECT

CROSS-REFERENCE TO RELATED APPLICATIONS

This application claims the benefit of U.S. Provisional Patent Application Ser. No. 60/633,264, filed on Dec. 3, 2004, which is incorporated herein by reference.

GOVERNMENT RIGHTS IN THIS INVENTION

This invention was made with U.S. government support under contract number NBCHC030039. The U.S. government has certain rights in this invention.

BACKGROUND OF THE INVENTION

1. Field of the Invention

The present invention relates to image processing. More particularly, the present invention relates to a method and apparatus for tracking an object using plurality of images that are spaced apart by an interval of time ("temporally-spaced images").

2. Description of Related Art

Tracking a movable object from an aerial or other type of platform, generally requires data association over long intervals of time. However, when a movable object moves the movable object may not remain continuously in a field of view while being tracked. The movable objects can leave the field of view for a number of reasons, including occlusions and inaccuracies in platform pointing directions. When another movable object appears in the field of view, the tracking of the movable object enters a realm of uncertainty because of the uncertainty of whether the latter-observed movable object is the same the formerly-observed movable object.

Visual object recognition of the movable objects is an important component of tracking a movable object, and prior research and development has provided a number of standard mechanisms for performing the visual object recognition. However, these standard mechanisms, such as frame-to-frame data association for multiple images, are not usable when the multiple images are separated by an interval of time (e.g., the multiple images are not contiguous).

Despite prior research and development regarding such object recognition, real-time, near-real time and/or other contemporaneous object recognition or "fingerprinting" remains a challenging problem. To begin with, only a limited amount information for carrying out training can be acquired from a first (or first set) of a plurality of the temporally-spaced images ("first learning image"). That is, only a limited amount of data can be garnered from and about the first learning image of a given moving object to develop a learning sequence for recognizing such given object.

Second, the prior research and development lacks mechanisms for providing reliable and invariant representations of features of the given object ("object features") that are captured in a the plurality of temporally-spaced images. For instance, the prior research and development lacks mechanisms for providing reliable and invariant object features to overcome drastic pose changes, aspect changes, appearance changes and various occlusions of the given object between the learning sequence and a query sequence. Consequently, the prior research and development lacks trustworthy mechanisms for correlating among one or more of the object features captured in the plurality of temporally-spaced images.

Third, the prior research and development lacks mechanisms to manage differences in the temporally-spaced images that result from capturing the temporally-spaced images using one or more differing platforms and/or resolutions. Fourth, the prior research and development lacks mechanisms to accurately segment, mask or otherwise discern the given object from the background. Additionally, the prior research and development lacks mechanisms to differentiate between the given object and one or more other objects that are similar to, but not the same as, the given object.

Therefore, there is a need in the art for a method and apparatus for tracking and/or monitoring an object using a plurality of temporally-spaced images.

SUMMARY OF THE INVENTION

Disclosed herein is a method and apparatus for tracking and/or monitoring an object using a plurality of temporally-spaced images, which includes first and second temporally-spaced images ("first and second images"). The method and apparatus include elements for aligning the first and second images as a function of (i) at least one feature of a first movable object captured in the first image, and (ii) at least one feature of a second movable object captured in the second image. The method and apparatus also include elements for comparing, after aligning the first and second images, at least one portion of the first image with at least one portion of the second image.

In one aspect, the method includes detecting from the first image at least one first feature associated with the first movable object, classifying the at least one first feature in accordance with its orientation to a first heading associated with the first movable vehicle and assigning a first descriptor to the at least one first feature. The method also includes detecting from the second image at least one second feature associated with the second movable object and classifying the at least one second feature in accordance with its orientation to a second heading associated with the second movable vehicle, where the first and second headings are in the same direction, The method further includes assigning a second descriptor to the at least one second feature; correlating the at least one first and the at least one second features as a function of the first and second descriptors, and comparing at least one portion of the first image with at least one portion of the second image.

By carrying out the elements for aligning and comparing, the method and apparatus may beneficially yield a positive or negative indication of a match between the first and second objects captured by the first and second images, respectively. The method and apparatus also beneficially allow for carrying out image recognition or "fingerprinting" of a movable object, such as a person or a movable vehicle, and/or performing reacquisition of the movable object after a temporary loss of tracking, which may occur as a result of an occlusion or other blocking condition.

BRIEF DESCRIPTION OF THE DRAWINGS

So that the manner in which the above recited features are attained and can be understood in detail, a more detailed description, which is briefly summarized above, is described below with reference to the Figures illustrated in the appended drawings.

It is to be noted that the Figures in the appended drawings, like the detailed description, are examples. And as such, the Figures and the detailed description are not to be considered limiting, and other equally effective examples are possible and likely. Furthermore, like reference numerals in the Figures indicate like elements: wherein:

FIG. 6 is a compilation of images illustrating examples of two temporally-spaced images for each of seven different movable objects captured by an aerial platform;

FIG. 7 is a third block diagram illustrating an orientation heading of a vehicle obtained from metadata collected from a navigation device;

FIG. 8 is a first diagram illustrating example images for detecting and classifying lines two vehicles;

DETAILED DESCRIPTION

Overview

The invention is a method and an apparatus for tracking and/or monitoring (collectively referred to herein as "tracking") an object using a plurality of images that are spaced apart by an interval of time ("temporally-spaced images"). The method and apparatus are particularly useful for carrying out image recognition or "fingerprinting" of a movable object, such as a person or a movable vehicle, and performing reacquisition of the movable object after a temporary loss of tracking, which may occur as a result of an occlusion or other blocking condition.

Tracking people, vehicles and other objects can be used by various applications to provide a number of important safety, security and other beneficial purposes. These applications may be pertinent to any number of products and industries, including automotive and transportation products and industries, entertainment products and industries, digital media products and industries, healthcare products and industries, life sciences products and industries, homeland security, image sensors and cameras, etc.

Example Architecture

Figure 1:
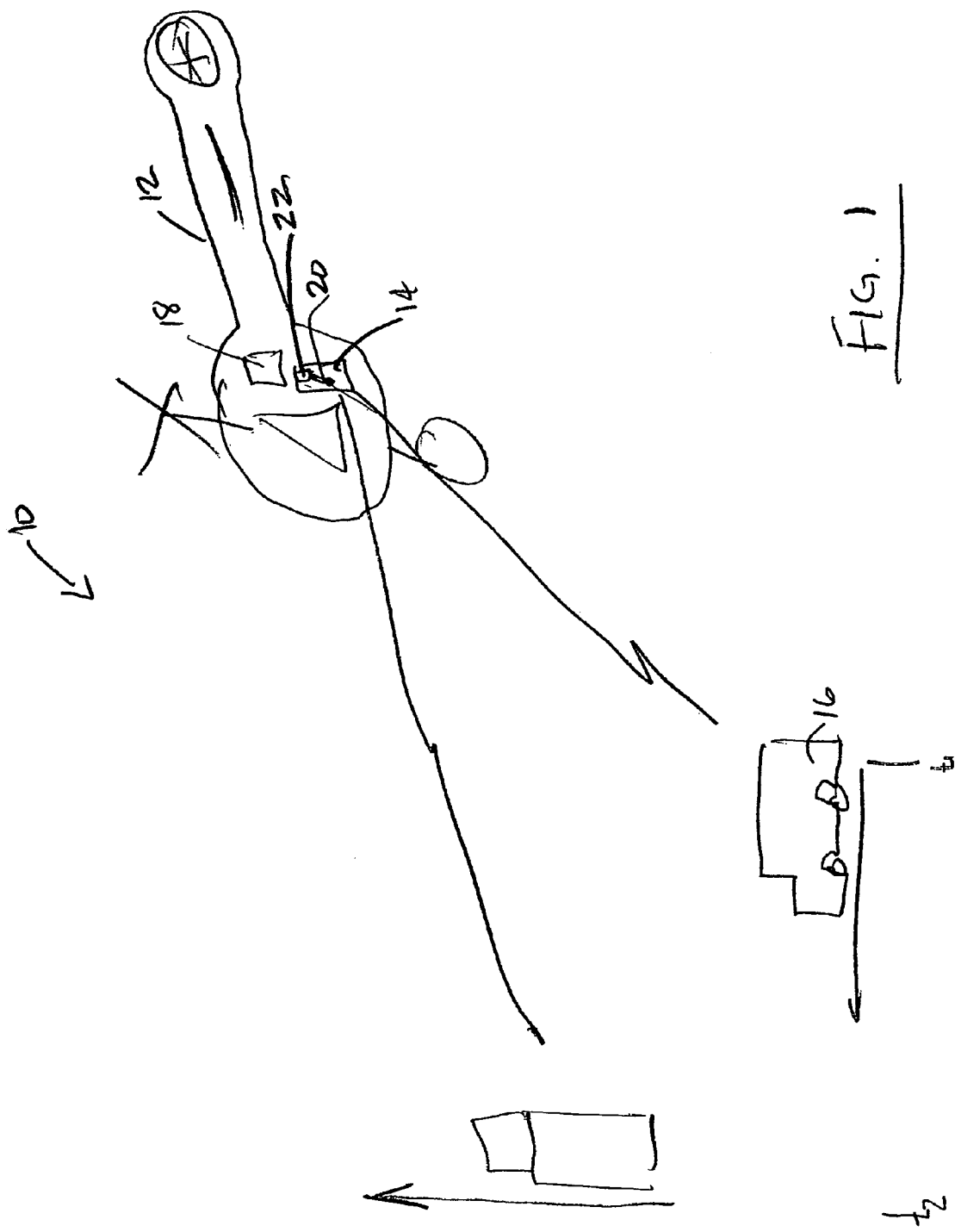
FIG. 1 is a first block diagram illustrating an example architecture 10 for tracking a movable object using temporally-spaced images.

FIG. 1 is a block diagram illustrating an example architecture 10 for tracking a movable object using a two or more video images, each of which is separated by an interval of time (referred to hereinafter as "temporally-spaced images"). The example architecture 10 includes an aerial platform 12, such as a umannned vehicle, helicopter and the like, having mounted or otherwise disposed thereon an image-acquisition and processing ("IAP") device 14 adapted to capture first and second video images of a movable object 16 at times t1 and t2, respectively. The example architecture 10 may also include a navigation device 18 for collecting metadata that contains navigation information of the aerial platform 12 and/or the movable object 16.

The IAP device 14, which may be embodied in hardware and/or software, may be a unitary device or be formed from one or more separate devices. Whether a unitary device or separate devices, the IAP device 14 typically includes an image-acquisition unit 20 for capturing the first and second video images, and a processing unit 22 for processing the first and second video images as needed. In addition, IAP device 14 may be concentrated on the aerial platform 12 or distributed among a number of nodes. As such, the image-acquisition unit 20 and the processing unit 22 may be physically separate and/or located on one or more different nodes, but are c capable of exchanging images and other information therebetween.

Figure 2:
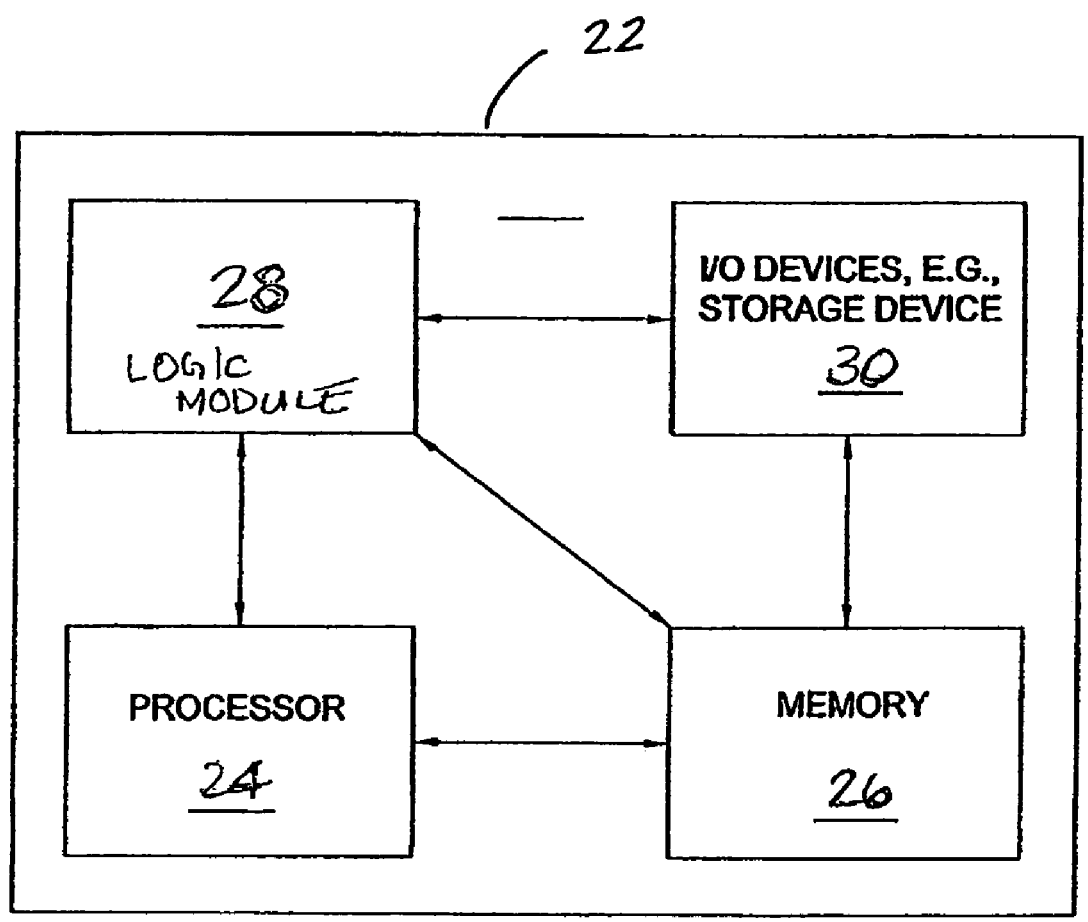
FIG. 2 is a second block diagram illustrating an example processing unit for performing the functions disclosed herein for tracking a movable object using temporally-spaced images.

By way of an example and with reference to FIG. 2, which is a block diagram illustrating a processing unit, such as the processing unit 22, for performing the functions disclosed herein. The processing unit 22 may be a general or specialty purpose computer adapted to performing the functions described herein. The processing unit 22 includes a processor element 24 (e.g., a CPU); a memory 26, (e.g., random access memory (RAM) and/or read only memory (ROM)); a logic module 28 for carrying out tracking, and various input/output devices 30 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that some or all of the processing unit 22 be implemented in software and/or in a combination of software and hardware, e.g., using application specific integrated circuits (ASICs), a general purpose computer or any other hardware equivalents. The logic module 28, for example, can be loaded into the memory 26 and executed by processor processing element 24 to implement the functions as discussed herein. As such, the present any of the functions discussed herein (including associated data structures) can be stored on a computer readable medium or carrier, e.g., RAM memory, magnetic or optical drive or diskette and the like.

Returning now to FIG. 1, the IAP device 14 may be adapted to obtain and associate with the first and second video images some or all of the metadata collected by the navigation device 18 at, around or other times related to times t1 and t2, respectively. As described in more detail below, the metadata collected at times t1 and t2 may be used by the IAP device 14 to assist in aligning any of the first and second video images with each other.

Example Operation

Figure 3:
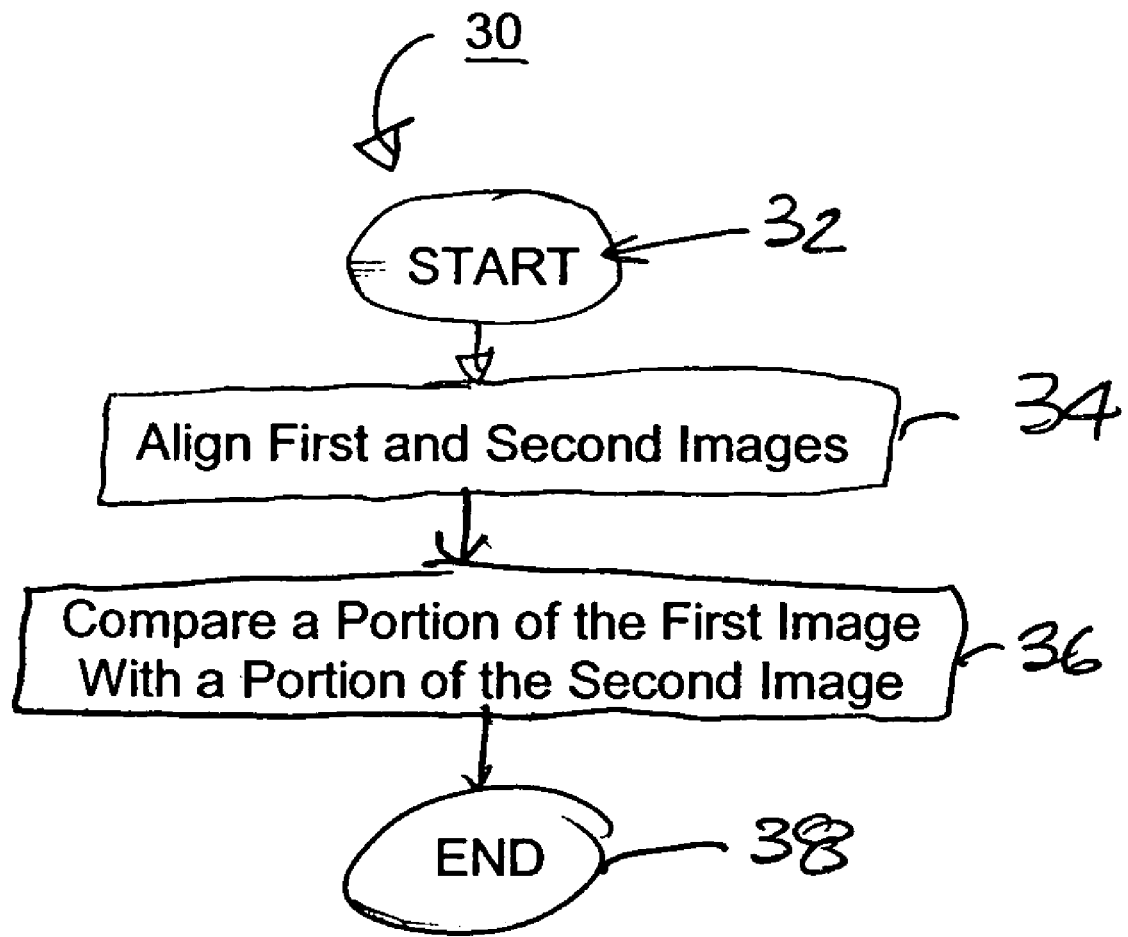
FIG. 3 is a first flow diagram illustrating a method for tracking a movable object using a two or more temporally-spaced images.

FIG. 3 is a flow diagram illustrating a method 30 for tracking a movable object using a two or more temporally-spaced images. Although the method 30 may be carried out using more than two temporally-spaced images, for simplicity, the method 30 is described below using only two images, namely, first and second images. In addition, the method 30 is described with reference to the example architecture 10 of FIG. 1. The method 30, however, may be carried out using architecture different from the example architecture 10.

At a first termination block 32, the method 30 is started responsive to IAP device 14 obtaining the first and second images. The IAP device 14, as shown in process block 24, then aligns the first and second images as a function of (i) at least one feature of a first movable object captured in the first image, and (ii) at least one feature of a second movable object captured in the second image. After aligning the first and second images, the IAP device 14 compares at least one portion of the first image with at least one portion of the second image, as shown in process block 36. And at a second termination block 38, the method 10 terminates.

By comparing at least one portion of the first image with at least one portion of the second image, the IAP device 14 may be operable to provide any of (i) a positive indication of a match between the first and second objects captured by the first and second images, respectively, and (ii) a negative indication of a match between the first and second objects captured by the first and second images, respectively.

Figure 4:
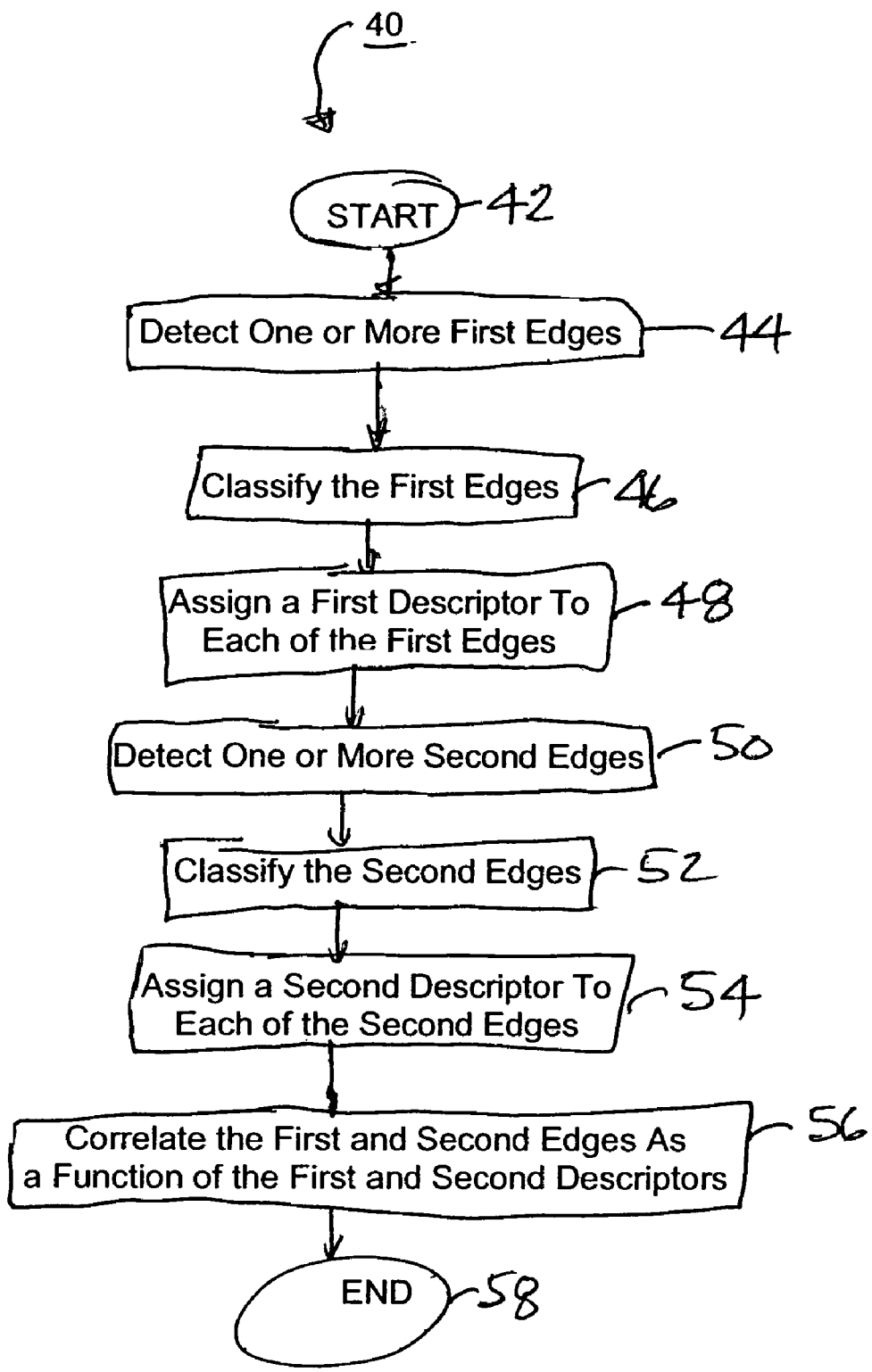
FIG. 4 is a second flow chart illustrating an example method for aligning a plurality of temporally-spaced images.

FIG. 4 is a flow chart illustrating an example method 40 for aligning a plurality of temporally-spaced images as a function of (i) at least one feature of a first movable object captured in one of the temporally-spaced images image, and (ii) at least one feature of a second movable object captured in another of the temporally-spaced images. Although the method 40 may be carried out using more than two temporally-spaced images, for simplicity, the method 40 is described below using only two images, namely, first and second images. In addition, the method 40 is described with reference to the example architecture 10 of FIG. 1, and the method 30 of FIG. 3. The method 40, however, may be performed using architecture different from the example architecture 10.

The method 40 starts at a first termination block 42, after the IAP device 14 obtains the first and second images. Sometime thereafter, the IAP device 14 detects from the first image one or more edges associated with one or more features of the first movable object ("first edges"), as shown in process block 44. Next, at process block 46, the IAP device 14 classifies the first edges in accordance with their orientation to a first heading that is associated with the first movable object, as shown in process block 46. The IAP device 14 also assigns a first descriptor to each of the first edges, as shown in process block 48.

Moving to process block 50, the IAP device 14 detects from the second image one or more edges associated with one or more features of the second movable object ("second edges"). Like the first edges, the IAP device 14 then classifies the second edges in accordance with their orientation to a second heading associated with the second movable object, as shown in process block 52. When defining the first and second headings, the IAP device 14 ensures that the first and second headings are associated to the first and second objects in the same manner.

At process block 54, the IAP device 14 assigns a second descriptor to each of the second edges. And at process block 56, the IAP device 14 correlates the first and second edges as a function of the first and second descriptors. The method 40 terminates at termination block 58.

In addition to the foregoing, the IAP device 14 may define the first and second headings. To facilitate this, the IAP device 14, for example, may obtain from the navigation device 18 metadata associated with the first image ("first metadata"). This first metadata may include a heading of the aerial platform 12 that is transformed into a direction of travel of the first movable object.

The IAP device 14 may also obtain obtaining from the navigation device 18 metadata associated with the second image ("second metadata"). The second metadata, like the first, may include a heading of the aerial platform 12 that is transformed into a direction of travel of the second movable object.

Figure 5:
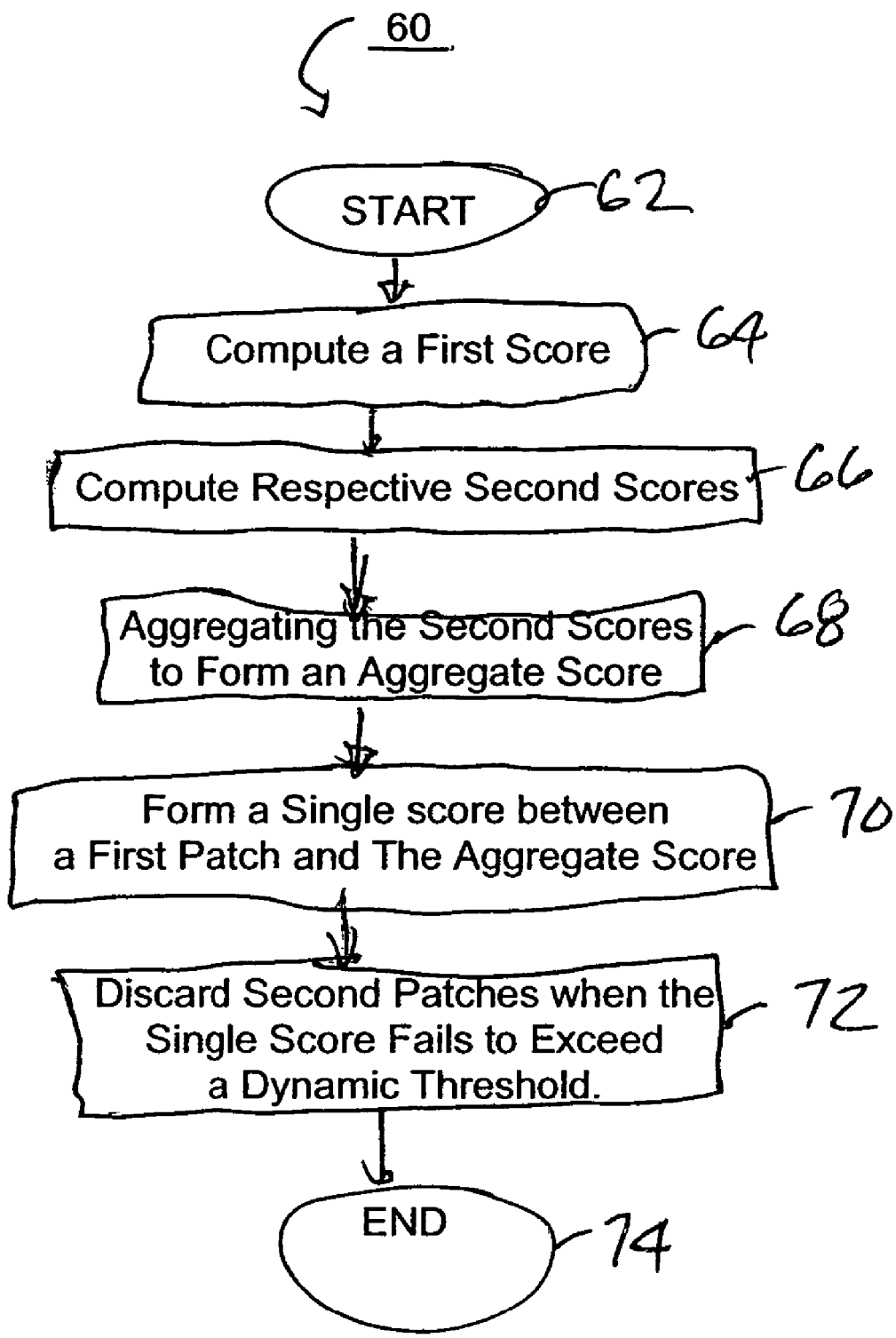
FIG. 5 is a third flow chart illustrating an example method for comparing portions of a first temporally-spaced image with portions of a second temporally-spaced image.

FIG. 5 is a flow chart illustrating an example method 60 for comparing at least one portion of the first image with at least one portion of the second image. Although the flow 60 may be carried out using more than two temporally-spaced images, for simplicity, the flow 60 is described below using only two images, namely, first and second images. In addition, the flow 60 is described with reference to the example architecture 10 of FIG. 1, and the method 30 of FIG. 3. The method 60, however, may be carried out using architecture different from the example architecture 10.

The method 60 starts at a first termination block 62, after the IAP device 14 obtains and aligns the first and second images, and selects a first patch of the first image for matching to a local distribution of second patches of the second image. At process block 64, the IAP device 14 computes for the first patch a first score that is associated with a spatial arrangement of the first patch. This spatial arrangement may include edge energy and orientations of the first patch. The IAP device 14 also computes for the second patches respective second scores that are associated with respective spatial arrangements of the second patches, as shown in process block 66. The spatial arrangements of the second patches may include edge energy and orientations of the respective second patches.

At process block 68, the IAP device 14 aggregates the second scores to form an aggregate score. The IAP device 14 sometime thereafter forms a single score between the first score and the aggregate score, as shown in process block 70. And in process block 72, the IAP device 14 discards the second patches when the single score fails to exceed a dynamic threshold. The method 60 terminates at termination block 74.

As an alternative to process block 72 of the method 50, the IAP device 14 may instead maintain the second patches as a match when the single score exceed the dynamic threshold.

Alternative Examples

FIG. 6 is a compilation of images illustrating seven examples 100 of two temporally-spaced images for each of seven different movable objects captured by an aerial platform, such as the aerial platform 12 (FIG. 1). As can be readily discerned from the seven examples 100, the two temporally-spaced images for each of the seven different movable objects has one or more differences in pose, aspect and appearances. For convenience, however, the following discusses only one of the seven examples 100, namely, the two temporally-spaced images for vehicle 110.

To handle these differences, the IAP device 14 extracts from a first image of the two temporally-spaced images one or more features of the vehicle to develop a vehicle fingerprint. The IAP device 14 is further adapted to compute a likelihood that the vehicles captured in the first image (a "learning sequence") and a second (or additional) image (a "query sequence") of the two temporally-spaced images are the same or different vehicles. The IAP device 14 is adapted to handle the differences in pose, aspect and appearances across the learning and query sequences using a feature-based quasi-rigid alignment coupled with a flexible matching between the some or all of the two temporally-spaced images.

Using the feature-based quasi-rigid alignment and flexible matching, the IAP device 14 is computes a similarity-matching score for the query sequence with respect to the query sequence, given that the learning and query sequences are separated by a temporal gap. In addition, the IAP device 14, in accordance with the feature-based quasi-rigid alignment and flexible matching, handles large pose and appearance changes by initially matching a sparse set of the features, and then, computing an interpolated dense motion field that is consistent with the motion of sparse correspondences. The IAP device 14 also employs a flexible local normalized correlation designed to compensate for small inaccuracies in alignment so as to provide the similarity scores.

The IAP device 14 may uses an affine invariant line feature descriptor to handle large pose changes. The affine invariant line feature descriptor may be used at low to moderate resolutions because the features of the vehicle in the learning and query sequences are predominantly linear.

Also, the IAP device 14 may be adapted to exploit reliable, albeit, sparse feature correspondences to generate a constrained interpolated flow field. This enables dense matching of the learning and query sequences. In addition, the IAP device 14 may handle a wide range of scales for both wide and narrow field-of-view (FOV) imaging scenarios. The IAP device 14 may handle imperfect object masks as well.

Sequence-to-Sequence Matching

To provide the sequence-to-sequence matching between the learning and query sequences, the IAP device 14 may obtain from the navigation device 18, which may include one or more inertial sensors, metadata that is translated to the vehicle. Sequence-to-sequence matching is robust to occlusion, pose, and lighting changes. Using the feature-based quasi-rigid alignment and flexible matching, the IAP device 14 finds a best match between the learning sequence and the query sequence even though the learning and query sequences may not be all affected by the occlusion, pose, and lighting changes.

If the learning and query sequences each include a number of frames, the IAP device 14 matches each frame of the learning sequence with each frame in the query sequence. To perform this frame-to-frame matching, the IAP device 14 uses aggregated matching of local neighborhoods and flexible templates to generate matching scores. The IAP device 14 chooses a matching score having a high likelihood of a match between the learning and query sequences is as a final match measure.

The IAP device 14 chooses a K pairs with or without temporal constraints as an option. As another alternative, the IAP device 14 may generate respective aggregated descriptors for the learning and query sequences, and then, match the learning and query sequence aggregated descriptors.

Use of Metadata

FIG. 7 is a block diagram illustrating an orientation heading of the vehicle obtained from metadata collected from a navigation device, such as the navigation device 18. Because the resolutions and appearance of the IAP device 14 can vary over a large range, for example between about 2-20 cm/pixel, the metadata can be used to pre-process the learning and query sequences to approximately match resolutions. Furthermore, an orientation of the aerial platform 12 and a direction of motion of the vehicle can be used to define three directions that correspond to one or more orientations of the vehicle in the learning and query sequences.

Feature-Based Quasi-Rigid Alignment

Under the feature-based quasi-rigid alignment, the IAP device 14 uses edge detection because vehicles fall within a category of objects in which edges of their features are most dominant. Ideally, when the IAP device 14 detects all the edges of the vehicle, reconstructs the three-dimensional (3D) locations and orientations, and obtains color or texture information for all regions delineated by the edges, the IAP device 14 can construct the geometry and appearance of the vehicle.

Given the relatively low resolution in aerial imagery, however, a reliable bottom-up reconstruction and 3D matching by the IAP device 14 is not practical. Alternatively, the IAP device 14 exploits a piecewise-parametric feature matching to create a seed set of reliable feature matches as a function of edges detected in the learning and query sequences. The IAP device 14 may use these matches to morph between the learning and query sequences as a function of a piecewise linear warping that is constrained by the feature matches. Although edge detection and the lines created thereby are favored, the IAP device 14 uses point detection can in a similar manner.

FIG. 8 is a diagram illustrating example images 300 for detecting and classifying lines of two vehicles. The example images 300 include four images 310-316 of a vehicle, two for each of two different poses. Superimposed on the images 312, 316 are first and second line-segments groups 318, 320, respectively, garnered from the IAP device 14 performing edge detection of such images. The IAP device 14 may use Canny edge detection, for example.

From the metadata or using dominant orientation computation, the IAP device 14 obtains an approximate driving direction of the vehicle. In this case, the IAP device 14 assigns the approximate driving direction to a positive Y-axis. The IAP device 14 defines the X-axis to be perpendicular to the driving direction and define the Z-axis to be perpendicular to the ground.

The IAP device 14 classifies (i) edges whose orientations are close to the driving direction as Y-edges, (ii) edges that are approximately perpendicular to the driving direction as X-edges, and (iii) optionally edges perpendicular to the ground as Z-edges. Because most vehicles do not have many edges that are exactly perpendicular to the ground (e.g., most sedans have sloped edges), Z-edges may be optionally undefined.

Instead, the IAP device 14 allows a large variation in X-edge orientations. Initially, the IAP device 14 detects as many edges as possible, and then, short edges belonging to the same classification are linked to form longer line segments when, for example, the short edges are close by or overlapping.

Each of the line segments in the line-segments groups 318, 320 is classified as a Y-line segment, an X-line segment or Z-line segment so as to correspond to the heading of the vehicle retrieved from the metadata. Each of the Y-line segment is defined to be located in a plane consistent with a driving direction of the vehicle. Each of the X-line segments is defined to be located in a plane consistent with a direction perpendicular to the driving direction. Each of the Z-line segments is defined to be located in a plane consistent with a direction perpendicular to the driving direction and the X-line segments.

To obtain invariant representation of each of the Y-line, X-line and Z-line segments, the IAP device 14 differentiates similar line segments appearing in mathematically rotated planes by classifying and matching such line segments in the three principal directions that are shown in FIG. 3. The IAP device 14 also assigns a feature descriptor to each of the line segments. This feature descriptor is invariant to moderate translation and scaling of the learning and query sequences.

The IAP device 14 uses all or a large part of available data to carry out an image morphing so as to (i) interpolate the correspondence field that is constrained by the sparse set of features and (ii) establish dense correspondences. This is unlike conventional image processing systems that rely on only discrete matches and fail to use all or a large part of the information available in images, which consequently, is especially limiting when dealing with low resolution imagery. On the other hand, carrying out the image morphing may approximate a weighted piecewise affine motion model, and as such the image morphing carried out by the IAP device 14 may handle both wide and narrow FOV imaging scenarios. When parallax cannot be ignored, however, the IAP device 14 may be adapted to use piecewise combinations of multiple affine models.

Line Segment Feature Descriptor

Figure 9:
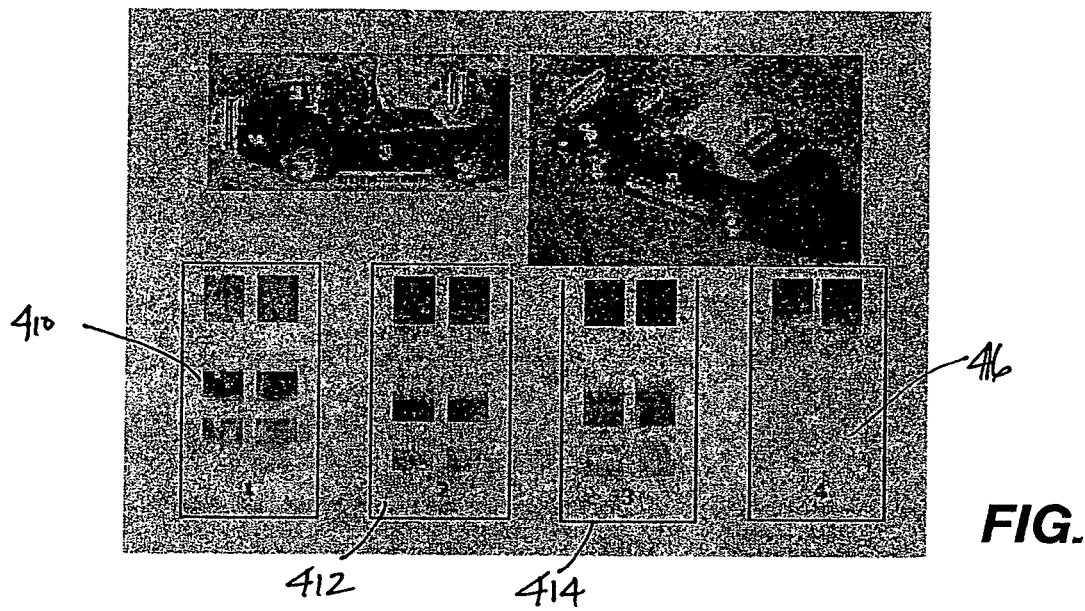
FIG. 9 is a second diagram illustrating a plurality of four example line descriptors.

FIG. 9 is a diagram illustrating a plurality of four example line descriptors 410-416. The line descriptors 400 include a respective band images formed by the IAP device 14 collecting [Y R G B] profiles along a small band of edges.

The IAP device 14 generates the band images. The IAP device 14 may generate the band images as a function of an intensity and/or a color transition from one side of a line to another because such transition may be distinctive. Because the image variation changes slowly parallel to the edges, the band images tend to be or are insensitive to instability of the line segments. The IAP device 14 maintains a sign of the line segments because bright-dark and dark-bright transitions of the band images may come from distinct object line segments.

Establish Line Correspondences

Figure 10:
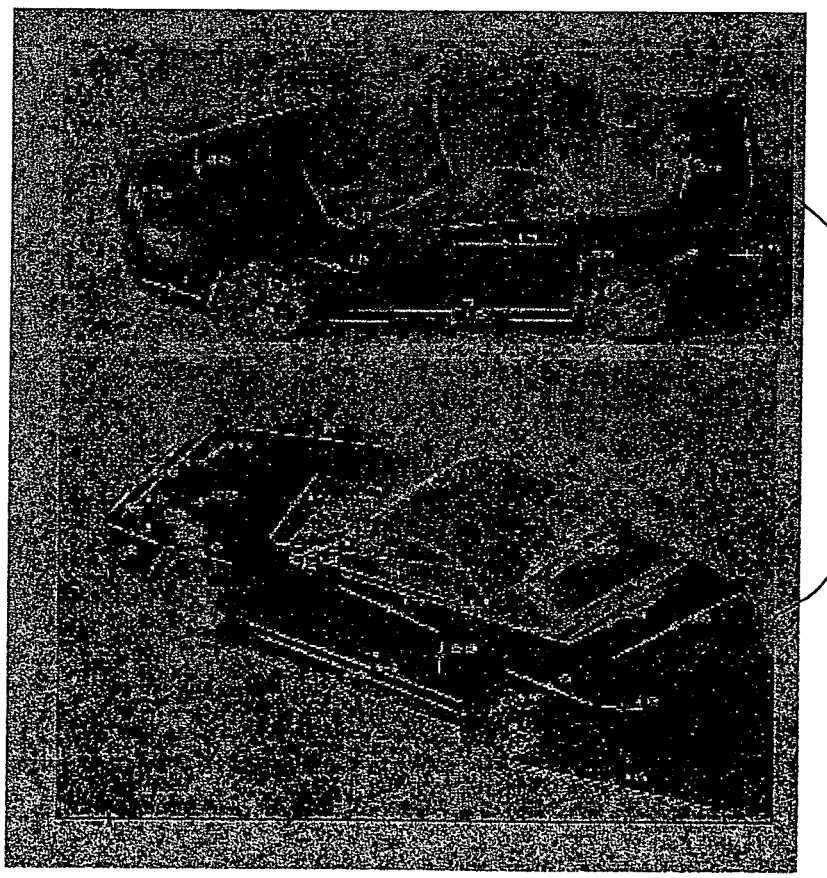
FIG. 10 is a third diagram illustrating example images having line correspondences superimposed thereon.

FIG. 10 is a diagram illustrating example images having line correspondences 500 superimposed thereon. The line correspondences 500 include an indication denote indices.

The IAP device 14 further performs a normalized correlation between the band images so as to establish between the learning and query sequences the line correspondences 500 for the Y-edges and X-edges. The IAP device 14 typically establishes the line correspondences 500 for the Y-edges and X-edges separately.

Reject Outliers

The IAP device 14 rejects from the line segments one or more outlying line segments that are similar in appearance, not associated with the vehicle, result in false matches; clutter the background. To remove these outlying line segments ("outliers"), the IAP device 14 performs object-shape-induced-rigidity constraints. These object-shape-induced-rigidity constraints may be performed in a progressively restricted way. For instance, the IAP device 14 may initially use a simple approximate rigidity constraint to prune raw features from the learning and query sequences, and if needed, performs further pruning using a more rigorous constraint.

By way of example, the IAP device 14 may initially assume that the query sequence include a target depth variation that is small compared to a target range. In each direction, the IAP device 14 projects line segments (e.g., X-edges or Y-edges) that are in parallel on a 3-dimensional ("3D") plane into families of parallel lines in the learning and query sequences, where the distances $d_i$ and $d_i'$ of corresponding lines to an image origin satisfy a linear mapping of the form $d_i'=sd_i+t$. The IAP device 14 rejects as outliers any matches of the line segments that poorly fit this model.

In addition, the IAP device 14 explicitly reconstructs a 3D position and locations of line segments from the learning and query sequence. The IAP device 14 may explicitly reconstruct the 3D position and locations from only two images because the metadata and line correspondences provide additional information for reconstruct the 3D position and locations.

Figure 11:
FIG. 11 is a fourth diagram illustrating example outlier rejection results.

The IAP device 14 need not perform an exact reconstruction of the 3D position and locations, but rather an approximate reconstruction may be sufficient for performing outlier rejection. This is because line segments belonging to the same object ("inliers") tend to group together and outliers tend to be reside separate from inliers after the 3D reconstruction. FIG. 11 is a diagram illustrating example outlier rejection results 600. Examples of the line correspondences 500 after outlier rejection are also shown in FIG. 6.

Extend Line Segments

Figure 12:
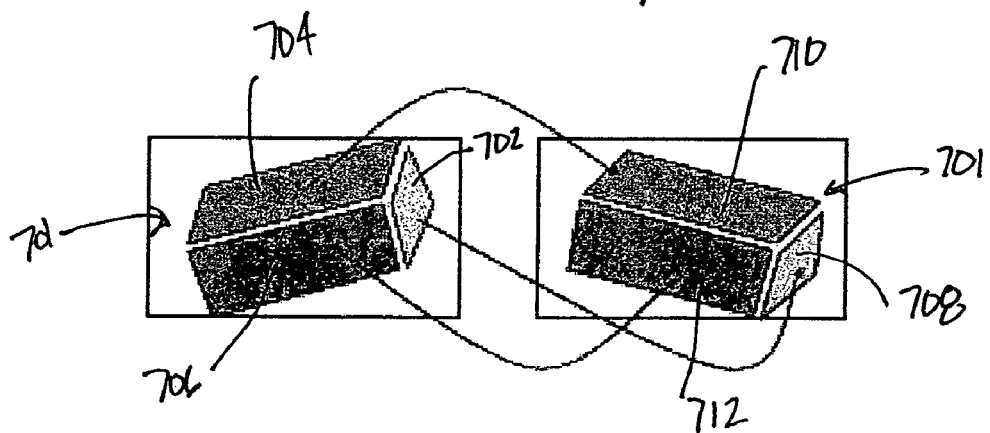
FIG. 12 is a fourth block diagram illustrating regions a 3D representation of the vehicle that underwent a 3D transformation.

FIG. 12 is a block diagram illustrating regions a 3D representation of the vehicle that underwent a 3D transformation. The IAP device 14 uses discrete matches approximate a dense motion field that accounts for 3D object structure and transformations of such 3D object structure.

As shown in FIG. 12, the 3D representation 701 of the vehicle includes first, second and third faces 702, 704, and 706, and after undergoing a 3D transformation the first, second and third faces transform into fourth, fifth and sixth faces 708, 710, and 712, respectively. The IAP device 14 is adapted to approximate by an affine transformation, which is defined by at least three lines surrounding the first face 702, for pixels within the first face 702.

In addition, the IAP device 12 establishes all local affine coordinate systems groups of three of the line correspondences 500. Because the IAP device 14 may require extensive resources to form the faces 702-712 without using explicit 3D models, the IAP device 14 may define a local similarity transformation from X-edges and Y-edges, separately. Furthermore, the IAP device 14 may define a local affine transformation from two edge correspondences.

To achieve the similarity transformation from one or more of the line correspondences 500, the IAP device 14 computes stable end points of the lines segments, and modify a direction of each line segment to point toward or perpendicular to heading of the vehicle depending on whether it is in the classified as a Y-edge or an X-edge. The IAP device 14, in turn, forms an intersection of each line segment classified as a Y-edge (X-edge) with a closest two lines classified as an X edge (Y-edge), thereby forming extended X-lines and Y-lines, each having redefined endpoints. The IAP device 14 may attempt to make all the extended lines classified as a Y-edge (X-edge) have uniform orientations, although orientation accuracy need not be very stringent.

Figure 13:
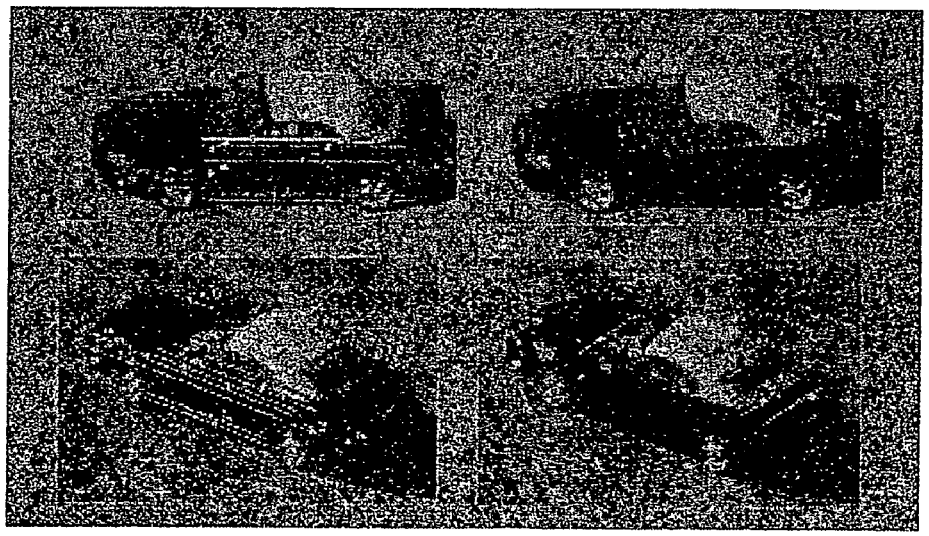
FIG. 13 is a fifth diagram illustrating examples of extended X-lines and Y-lines.

FIG. 13 is a diagram illustrating examples of the extended X-lines and Y-lines.

Interpolate Flow Fields

The IAP device 14 defines an image flow field that is a similarity transformation that aligns the redefined endpoints. Given multiple line segment correspondences, the IAP device 14 forms a weighted average of the flow fields. The weights of the weighted average decay away from each of the extended X-lines and Y-lines, thereby ensuring that the extended X-lines and Y-lines segment only affects the flow field in its vicinity.

The resulting flow field may be smooth and coincident with the line segment correspondences 500. The IAP device 14 uses the interpolated correspondence field to overcome undesired appearance and/or texture information in between the features. The IAP device 14 may use the interpolated flow field to align the learning and query sequences.

Incorporation of Points

Figure 14:
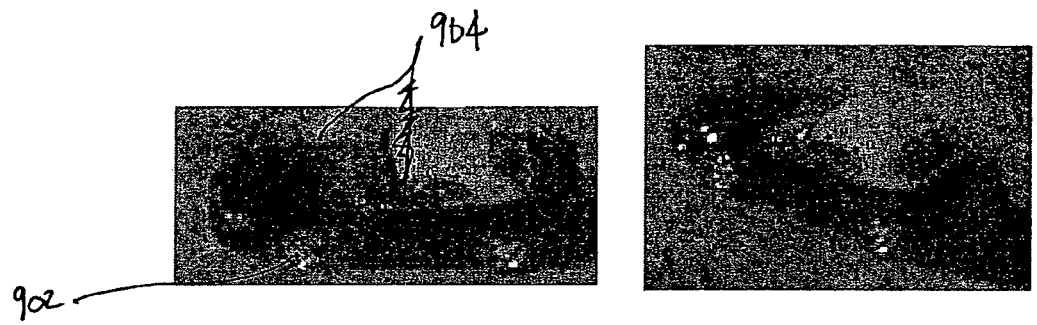
FIG. 14 is a sixth diagram illustrating an example of surviving point correspondences after outlier rejection.

As an alternative to the edges, the IAP device 14 may use points. FIG. 14 is a diagram illustrating an example of surviving point correspondences 900 after outlier rejection. In this example, only points 902 on the near side of the vehicle have good correspondences, and very few points 904 correspond well on the far side of the vehicle. Because the coverage is poor in this example, the IAP device 14 may use the points together with lines to constrain the flow field.

Figure 15:
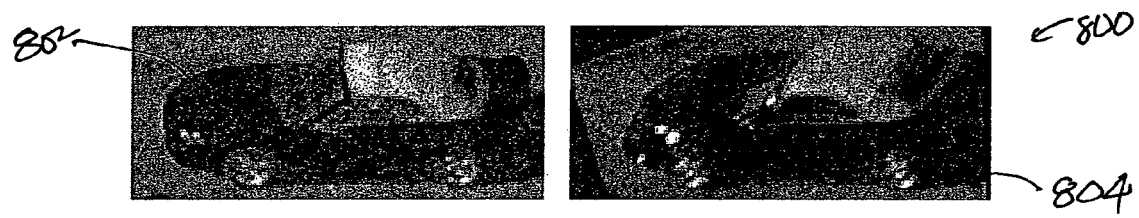
FIG. 15 is a seventh diagram illustrating results of a quasi-rigid alignment for learning and query sequences.

FIG. 15 is a diagram illustrating results 800 of a quasi-rigid alignment for learning and query sequences, such as the learning and query sequences shown in FIG. 13. The results 800 include the learning sequence 802 and a warped query sequence 804. As shown, the pose change is about 33 degrees. The pose change may be different from the 33 degrees as well.

Flexible Local Template Matching

The IAP device 14 accounts for approximations in alignment as well as appearance difference due to a variety of unmodeled changes. To facilitate this, IAP device 14 matches a patch of the learning sequence ("learning patch") with a local distribution of patches in the query sequence ("query patches") after aligning the learning and query sequences.

The IAP device 14 may apply an oriented-energy filter to the learning and query patches to form a match. The oriented-energy filters capture significant features in a patch, while ignoring certain illumination effects. Each of the learning and query patches capture a respective spatial arrangement of edge energy and orientations. In order to account for local alignment differences, the IAP device 14 performs a nearest neighbor matching of the learning patch to the query patches. To facilitate this, the IAP device 14 calculates a score of the query patch as that of the best matching patch within a small range of translations around the query patch to be matched. The IAP device 14 aggregates scores from all the local patches to compute a single score between learning and query sequences. The IAP device 14 retains only query patch patches that containing energy above a dynamic threshold. This may beneficially avoid finding matches in irrelevant background. The IAP device 14 sums the energy is over color channels so as to include edges that only appear in color, but not in luminance.

Alternatively, the IAP device controls a size of the query patches. When the query patch are much smaller than the nominal scale of features in a neighborhood, then a pattern the query patch may match at many shifts and with many objects. On the other hand, when a query patch is too large, the query patch may be too sensitive to appearance changes and misalignments, and consequently might not be sensitive enough to small, but discriminative patterns. The IAP device 14 selects a patch size by choosing, for each location in an a query sequence, a size of a window centered in the window whose gray level distribution has maximum entropy.

The IAP device 14 may also augments the score with two additional terms to give an overall similarity metric. This beneficially overcomes conventional local template matching scores that fail to discriminate objects that have the same geometric structure and differ only in color. To facilitate this, the IAP device 14 may perform local template matching using red-green-blue (RGB) images, and/or average color similarity as measured by the angle between RGB vectors.

Figure 16:
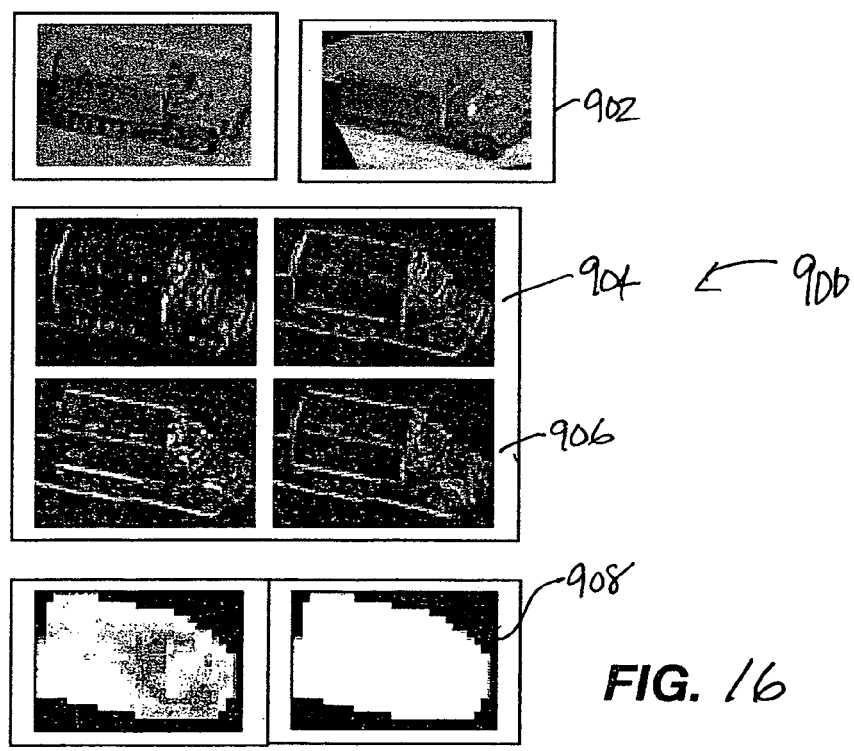
FIG. 16 is an eighth diagram depicting results of a feature-based quasi-rigid alignment and a flexible local template matching.

FIG. 16 is a diagram depicting results 900 of a feature-based quasi-rigid alignment and a flexible local template matching. The results 900 include (i) learning and query frames 902 after quasi-rigid alignment, (ii) learning and query frames 904 after oriented energy in four directions, (iii) learning and query frames 906 after local correlations scores with global affine versus quasi-rigid alignment, and learning and query frames 908 after flexible local template matching using an 11 pixel search range.

Figure 17:
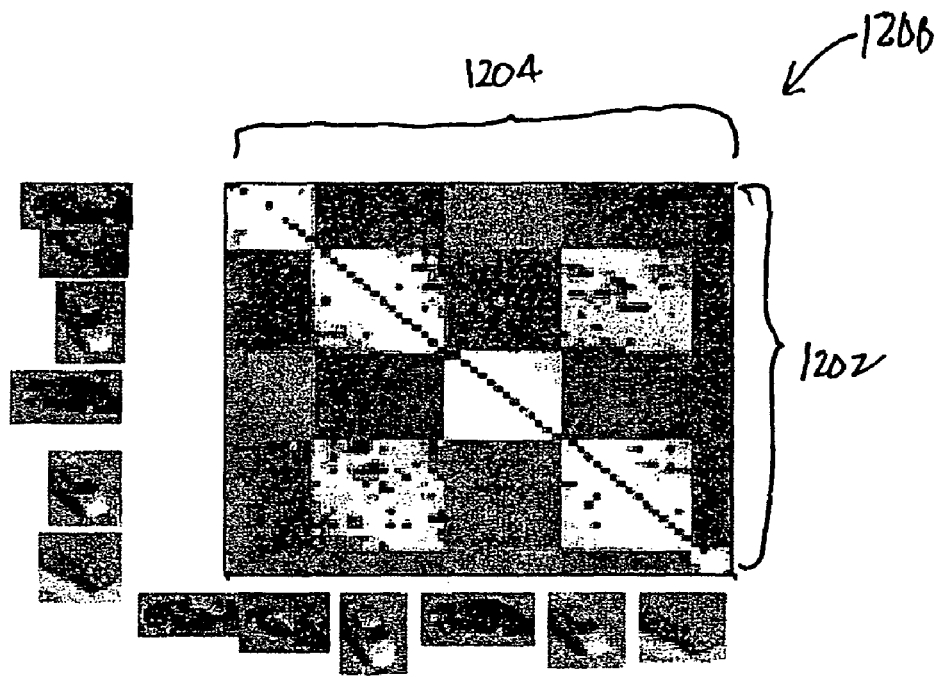
FIG. 17 is a ninth diagram Illustrating a similarity matrix of a quasi-rigid alignment and flexible matching algorithm on five narrow FOV video objects.

FIG. 17 is a diagram Illustrating a similarity matrix 1200 of a quasi-rigid alignment and flexible matching algorithm on five narrow FOV video objects. The similarity matrix 1200 includes learning and query sequences drawn from a narrow FOV data of five different vehicles. Each row 1202 of the similarity matrix 1200 is a query sequence and each column 1204 of the similarity matrix 1200 is a learning sequence. The five distinct bands of rows 1204 and columns 1206 correspond to the five different vehicles, illustrated by the sample image chips. Brighter matrix elements indicate higher likelihood scores and completely black elements indicate (query, learning) pairs that were excluded. The similarity matrix may have a block diagonal structure with consistently high scores on the main diagonal blocks and consistently low scores elsewhere. Alternatively, within each main diagonal block, the score may be highest near the central diagonal and slightly decreasing away from the center. This can result from the score decreasing slightly as the temporal gap increases, which may indicate resilience to pose changes.

Figure 18:
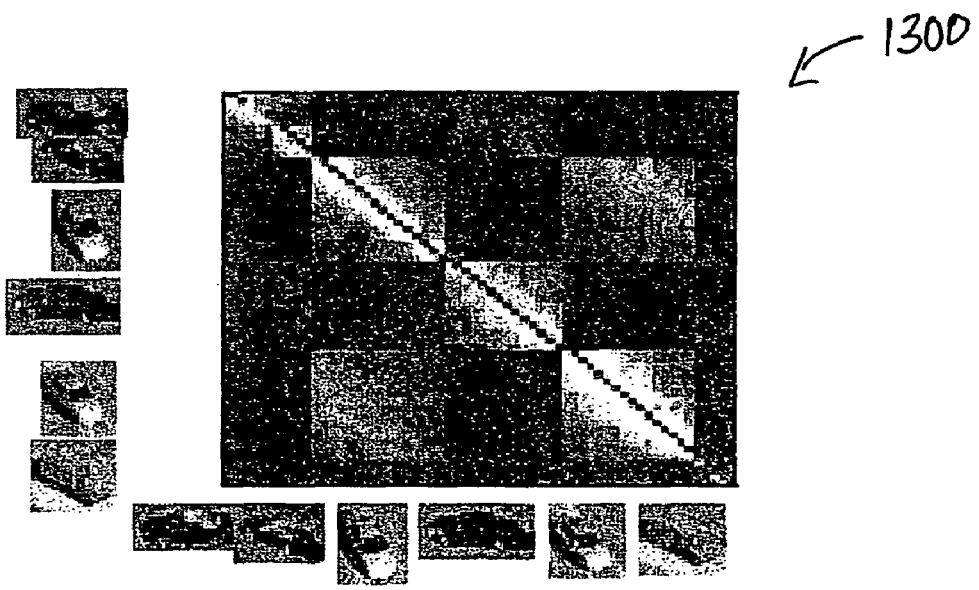
FIG. 18 is a tenth diagram illustrating a similarity matrix for global 2D affine alignment and global correlation algorithm on five narrow FOV video objects.

FIG. 18 is a diagram illustrating a similarity matrix 1300 for global 2D affine alignment and global correlation algorithm on five narrow FOV video objects. The similarity matrix 1300 includes the same set of sequences as in the similarity matrix 1200 in FIG. 17. Within each main diagonal block, the score is highest near the central diagonal and quickly decreases away from the center. That is, the score decreases quickly as the temporal gap increases, thereby indicating poor resilience to pose changes.

Figure 19:
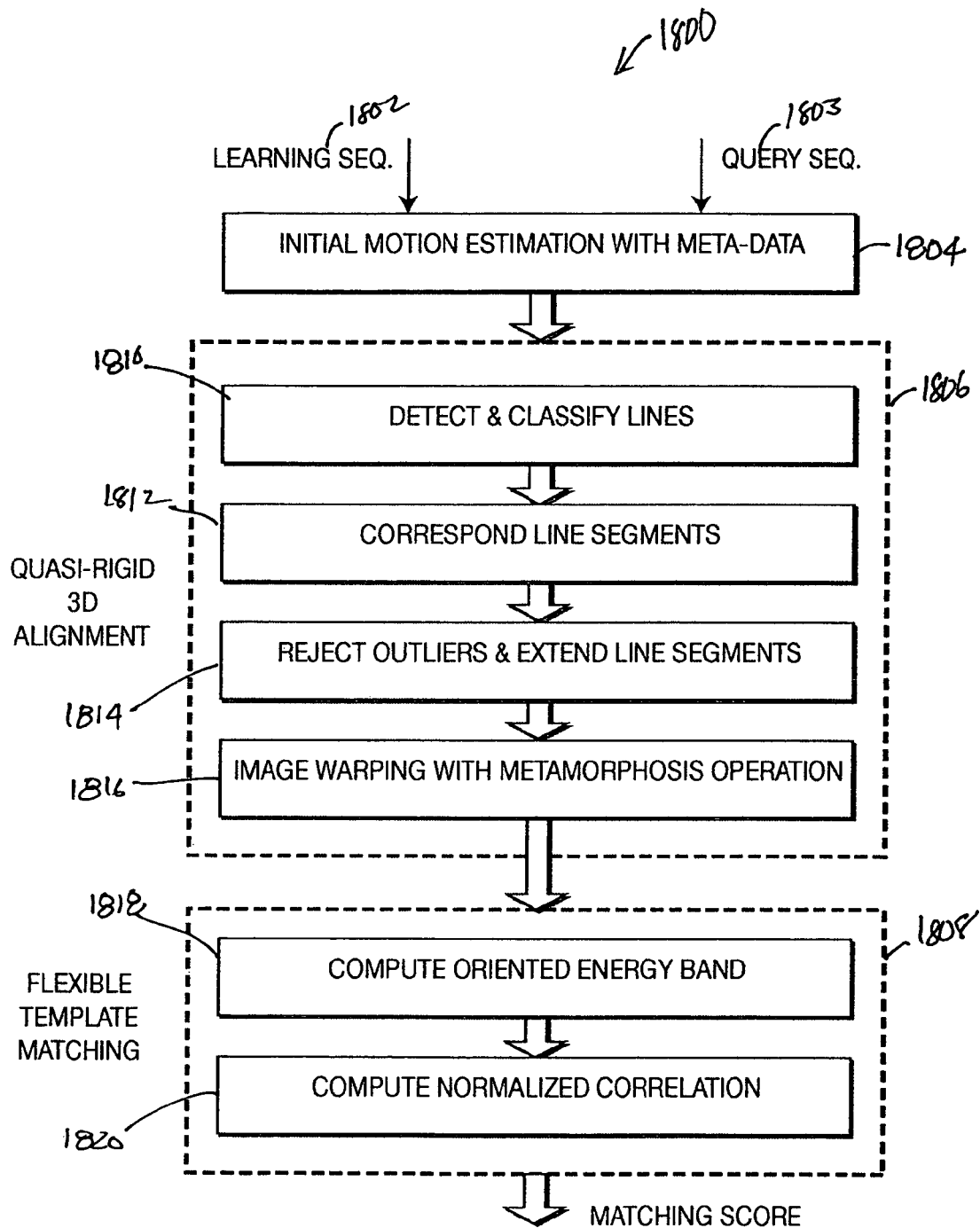
FIG. 19 is a fourth flow diagram illustrating a method for fingerprinting for reacquisition and tracking in videos.

FIG. 19 is a flow diagram illustrating a flow 1800 for fingerprinting for reacquisition and tracking in videos. At least one learning sequence 1802 and at least one query sequence 1803 are input to the method 1800. At 1804, an initial motion estimation is performed with metadata, and then, a quasi-rigid 3D alignment 1806 and flexible template matching 1808 are performed. The Quasi-rigid 3D alignment includes detecting and classifying lines 1810, corresponding line segments 1812, rejecting outliers and extending line segments 1814, and performing an image warping with metamorphosis operation 1816. Flexible template matching 1808 includes computing at least one oriented energy band 1816 and computing at least one normalized correlation 1820. As a result, the method 1800 produces at least one matching score.

Conclusion

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for tracking an object using a plurality of images, each of which is separated by an interval of time, wherein the plurality of images comprises a first image and a second image, the method comprising:

detecting from the first image at least one first feature associated with a first movable object;

classifying the at least one first feature in accordance with its orientation to a first heading associated with the first movable object;

assigning a first descriptor to the at least one first feature;

detecting from the second image at least one second feature associated with a second movable object;

classifying the at least one second feature in accordance with its orientation to a second heading associated with the second object, wherein the first and second headings are in the same direction;

assigning a second descriptor to the at least one second feature;

correlating the at least one first feature and the at least one second feature as a function of the first and second descriptors to align the first image with the second image; and matching a first patch of the first image to a local distribution of second patches comprising:

computing for the first patch a first score that is associated with a spatial arrangement of the first patch;

computing for the second patches respective second scores that are associated with respective spatial arrangements of the second patches;

aggregating the second scores to form an aggregate score;

forming a single score between the first patch and the aggregate score; and discarding the second patches when the single score fails to exceed a dynamic threshold, otherwise maintaining the second patches as a match.

2. The method of claim 1, further masking the first and second images image to produce first and a second masked images, respectively, wherein comparing at least one portion of the first image with at least one portion of the second image comprises: comparing all of the first masked image with all of the second masked image.

3. The method of claim 1, wherein the first and second descriptors comprise respective first and second affine invariant line feature descriptors.

4. The method of claim 1, further comprising: defining the first and second headings.

5. The method of claim 4, wherein defining the first and second headings comprises:

obtaining first metadata associated with the first image, wherein the first metadata comprises the first heading; and obtaining second metadata associated with the second image, wherein the second metadata comprises the second heading.

6. The method of claim 1, wherein comparing at least one portion of the first image with at least one portion of the second image comprises: performing flexible template matching.

7. The method of claim 6, wherein the quasi-rigid alignment uses a flow-field that is interpolated from a plurality of sparse correspondences between the at least one feature of the first movable object and the at least one feature of the second movable object.

8. The method of claim 1, further comprising: performing initial motion estimation using metadata associated with the first image.

9. The method of claim 1, wherein the first and second images comprise at least one learning sequence of images and at least one query sequence of images, respectively, and wherein aligning the first and second images comprises: performing a quasi-rigid alignment of the at least one learning sequence of images and the at least one query sequence of images.

10. The method of claim 9, wherein performing the quasi-rigid alignment comprises:

detecting from the first image a plurality of first line segments associated with the at least one feature of the first movable object;

classifying the plurality of first line segments in accordance with their orientation to a first heading associated with the first movable vehicle;

forming from the plurality of first line segments at least one first line;

assigning a first descriptor to the at least one first line;

detecting from the second image at plurality of second line segments associated with the at least one feature of the second movable object;

classifying the plurality of second line segments in accordance with their orientation to a second heading associated with the second movable vehicle, wherein the first and second headings are in the same direction;

assigning a second descriptor to the at least one second line; and performing a warp of the first and second images as a function of the first and second descriptors.

11. The method of claim 1, wherein comparing at least one portion of the first image with at least one portion of the second image comprises computing at least one oriented energy band; and computing at least one normalized correlation.

12. The method of claim 1, further comprising: generating a constrained interpolated flow field as a function of the at least one first feature associated with the first movable object and the at least one second feature associated with the second movable object.

13. The method of claim 1, wherein the at least one first feature and the at least one second feature are edges.

14. The method of claim 13, wherein the first and second descriptors are first and second band images, respectively, formed by collecting samples around a band along detected edges in each of the first image and the second image.

15. The method of claim 14, wherein the samples indicate intensity/color transitions from one side to the other of a line segment belonging to an edge.

16. The method of claim 14, wherein the step of correlating the at least one first and the at least one second features as a function of the first and second descriptors to align the first image with the second image further comprises employing a normalized correlation between the first and second band images to establish line correspondences between the first image and the second image.

17. The method of claim 16, wherein the patch captures a spatial arrangement or edge energy and orientations within the patch.

18. The method of claim 1, wherein a patch is represented using at least one oriented energy filter output.

19. An apparatus for tracking an object using a plurality of images, each of which is separated by an interval of time, wherein the plurality of images comprises a first image and a second image, the apparatus comprising a computer processor configured for:

detecting from the first image at least one first feature associated with a first movable object;

classifying the at least one first feature in accordance with its orientation to a first heading associated with the first movable object;

assigning a first descriptor to the at least one first feature;

detecting from the second image at least one second feature associated with a second movable object;

classifying the at least one second feature in accordance with its orientation to a second heading associated with the second movable object, wherein the first and second headings are in the same direction;

assigning a second descriptor to the at least one second feature;

correlating the at least one first feature and the at least one second feature as a function of the first and second descriptors to align the first image with the second image; and matching a first patch of the first image to a local distribution of second patches comprising:

computing for the first patch a first score that is associated with a spatial arrangement of the first patch;

computing for the second patches respective second scores that are associated with respective spatial arrangements of the second patches;

aggregating the second scores to form an aggregate score;

forming a single score between the first patch and the aggregate score; and discarding the second patches when the single score fails to exceed a dynamic threshold, otherwise maintaining the second patches as a match.

20. The apparatus of claim 19, wherein the computer processor is further configured for masking the first and second images to produce first and second masked images, respectively, wherein the means for comparing at least one portion of the first image with at least one portion of the second image comprises: a means for comparing all of the first masked image with all of the second masked image.

* * * * *